(12) United States Patent
Suryanarayana et al.

(10) Patent No.: US 12,061,704 B2
(45) Date of Patent: Aug. 13, 2024

(54) VULNERABILITY MITIGATION RESOURCE RUNNING EMBEDDED OPERATING SYSTEM ON HYBRID CORE

(71) Applicant: Dell Products L.P., Round Rock, TX (US)

(72) Inventors: Shekar Babu Suryanarayana, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 312 days.

(21) Appl. No.: 17/727,896

(22) Filed: Apr. 25, 2022

(65) Prior Publication Data
US 2023/0342477 A1    Oct. 26, 2023

(51) Int. Cl.
*G06F 9/455* (2018.01)
*G06F 9/4401* (2018.01)
*G06F 9/50* (2006.01)
*G06F 21/57* (2013.01)

(52) U.S. Cl.
CPC .......... *G06F 21/577* (2013.01); *G06F 9/4408* (2013.01); *G06F 9/45529* (2013.01); *G06F 9/5077* (2013.01)

(58) Field of Classification Search
CPC .. G06F 21/577; G06F 9/4408; G06F 9/45529; G06F 9/5077
See application file for complete search history.

(56) References Cited

U.S. PATENT DOCUMENTS

| | | | |
|---|---|---|---|
| 8,869,282 B1 * | 10/2014 | Lazarowitz | G06F 21/566 713/189 |
| 11,157,628 B2 * | 10/2021 | Suryanarayana | G06F 21/572 |
| 2018/0074884 A1 * | 3/2018 | Cady | G06F 11/0787 |
| 2021/0026967 A1 * | 1/2021 | Suryanarayana | G06F 21/575 |

* cited by examiner

*Primary Examiner* — Kostas J Katsikis
(74) *Attorney, Agent, or Firm* — Jackson Walker L.L.P.

(57) ABSTRACT

A vulnerability management method acquires, during an OS runtime of an information handling system, vulnerability information indicating potentially vulnerable resources of the system. Disclosed methods calculate a vulnerability determination code (VDC) based on the vulnerability information. The VDC may indicate a scan zone that includes one or more scan zone components. Each component may correspond to a region of a potentially vulnerable resource. After a system reset, disclosed methods may perform a vulnerability aware (VA) boot sequence. The VA boot sequence may include, prior to booting a runtime operating system, determining, in accordance with the vulnerability information, whether to perform a comprehensive vulnerability detection (CVD) boot. A CVD boot refers to a boot sequence configured to boot a distinct operating system dedicated to performing a targeted vulnerability assessment that includes scanning the scan zone components indicated by the VDC. This dedicated OS may be implemented as an embedded OS (EOS).

16 Claims, 5 Drawing Sheets

VULNERABILITY MITIGATION RESOURCE RUNNING EMBEDDED OPERATING SYSTEM ON HYBRID CORE

TECHNICAL FIELD

The present disclosure relates to information handling systems and, more particularly, identifying security vulnerabilities in a system and taking action in response.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems, including server-class systems and appliances, desktop systems, laptops, and so forth, may execute application programs within the context of an operating system (OS). The OS itself may be loaded into system memory from a storage resource as part of a boot sequence following a system reset or another boot-triggering event.

An OS space may become susceptible to numerous vulnerabilities. While it would be desirable to mitigate OS vulnerabilities at the first opportunity, conventional methods for detecting and mitigating OS space vulnerabilities expect a fully-booted OS. In other words, conventional OS mitigation methods do not begin until the OS is loaded and scanned.

SUMMARY

Teachings disclosed herein address limitations associated with conventional OS mitigation approaches, which are inherently booted-OS approaches, i.e., execute only after OS is loaded. Methods and systems disclosed herein support a dedicated and secure compute domain running an embedded OS (EOS) on a hybrid core to compute one or more vulnerability metrics before booting the OS. Disclosed methods perform comprehensive vulnerability mitigation in a spawned boot path based on a vulnerability index which resides on a hybrid core that is active before OS runtime. In at least some embodiments, disclosed OS mitigation features computer a vulnerability determination code (VDC) that reflects a composite of reported vulnerabilities based on OS use, OS updated, firmware updates, etc. A complete telemetry index may be created locally and sourced from the cloud.

The EOS may generate a telemetry metric report to collect advanced server hardware telemetry, such as hardware telemetry supported by a baseboard management controller (BMC) exemplified by the integrated Dell Remote Access Controller 9 (iDRAC9) from Dell Technologies for analysis. The EOS may also perform a deep scan of vulnerable resources including, without limitation, a master boot record (MBR) of the OS, OS telemetry data, CPU address translation on the main CPU system address, a trusted platform module (TPM), network, hard disk, and OS vulnerabilities, Bit Locker recovery, and hardware diagnostic use cases based on vulnerability. Based on the telemetry data and the deep scan, remediation may then be performed before booting an operational OS. In this manner, disclosed features support an out of band (OOB) vulnerability monitor and manager on the platform, including auto-detection and recovery of OS boot issues attributable to corrupted boot loaders.

Executing disclosed vulnerability mitigation services in the EOS provides a safer and vulnerability-free boot path environment that includes dynamic injection of a VDC into the EOS provides an out-of-band vulnerability experience on the platform prior to OS boot. OS independent incremental scans dynamically mitigate vulnerabilities in OS-specific data, virtual machines (VMA), Docker Partitions, Container Images, etc. Integrated telemetry logs aid deterministic quarantine with latest definitions on a timely basis. Thus, disclosed features achieve a seamless boot to OS (network/local/USB) with auto recovery services running in EOS.

Subject matter included herein discloses one or more vulnerability management methods that monitor and/or acquire, during an OS runtime of an information handling system, vulnerability information indicating potentially vulnerable resources of the information handling system. Disclosed methods calculate a vulnerability determination code (VDC) in accordance with the vulnerability information. The VDC may be indicative of a scan zone that include one or more scan zone components, wherein each scan zone component corresponds to a region of a potentially vulnerable resource. Responsive to detecting a system reset, disclosed methods perform a vulnerability aware (VA) boot sequence. The VA boot sequence may include, prior to booting a runtime operating system, determining, in accordance with the vulnerability information, whether to perform a comprehensive vulnerability detection (CVD) boot. A CVD boot refers to a boot sequence configured to boot a distinct operating system dedicated to performing a targeted vulnerability assessment that includes scanning the scan zone components indicated by the VDC. This dedicated OS may be implemented as an embedded OS (EOS).

The VDC may be embedded in a secure blob and may function as an authenticated boot path recognizable only to the dedicated OS. In at least some embodiments, the information handling system includes a hybrid core processor comprising one more performance cores and at least one efficiency core. In some such embodiments, the system employs a hybrid performance processor including one or more performance cores and one or more efficiency cores. In such embodiments, the EOS boot may be configured to boot the EOS for the sole or primary purpose of perform a CVD as described herein.

After or as part of the EOS boot, mitigation services may be performed to mitigate one or more vulnerabilities identified by the targeted vulnerability assessment. The VDC itself, may be determined in accordance with multiple factors such as a previous boot status of the information handling system, one or more telemetry logs, operating system (OS) specific data, virtual machine (VMV) data, docker partitions, container images, and file systems.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
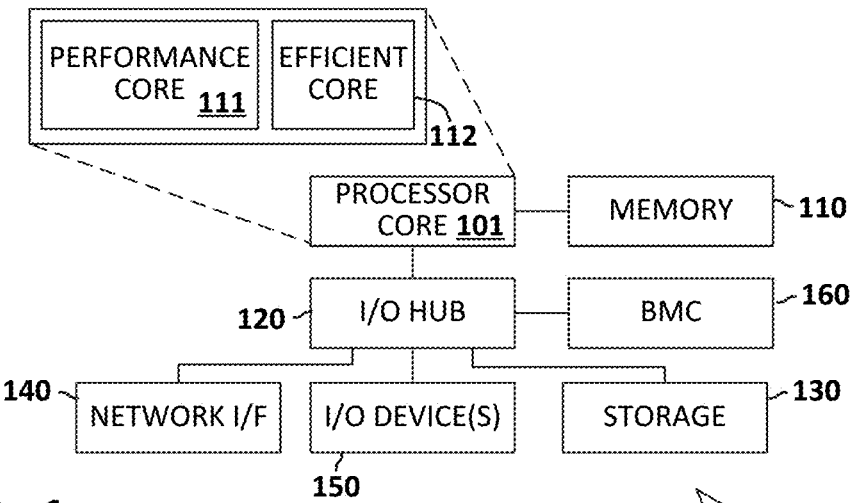
FIG. 1 illustrates an information handling system in accordance with disclosed teachings.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

Disclosed features include a method to dynamically trigger an EOS boot on a hybrid core only to run a CVD service in the boot path prior to OS runtime. The CVD service retrieves a VDC that is determined in accordance with various factors including, without limitation, previous boot status, corruption, updates/recovery, telemetry logs, VM/Container configurations, etc. In at least some embodiments, the VDC indicates a secure boot path, recognized by the EOS only, which validates and dynamically enumerates the boot path and launches VDC modules that execute mitigation services.

Referring now to FIG. 1, an information handling system 100 suitable for implementing vulnerability features elements and operations illustrated in FIG. 2 through FIG. 6 may be implemented as or within an information handling system exemplified by the information handling system 100 illustrated in FIG. 1. The illustrated information handling system includes a processor core, referred to herein as hybrid core 101, with one or more general purpose processors or central processing units (CPUs) communicatively coupled to a memory resource 110 and to an input/output hub 120 to which various I/O resources and/or components are communicatively coupled. The hybrid core 101 illustrated FIG. 1 is includes one or more comparatively large, high speed performance cores 111 and one or more comparatively small efficiency cores 112 that are optimized for per watt performance.

The I/O resources explicitly depicted in FIG. 1 include a network interface 140, commonly referred to as a NIC (network interface card), storage resources 130, and additional I/O devices, components, or resources 150 including as non-limiting examples, keyboards, mice, displays, printers, speakers, microphones, etc. The illustrated information handling system 100 includes a baseboard management controller (BMC) 160 providing, among other features and services, an out-of-band management resource which may be coupled to a management server (not depicted). In at least some embodiments, BMC 160 may manage information handling system 100 even when information handling system 100 is powered off or powered to a standby state. BMC 160 may include a processor, memory, an out-of-band network interface separate from and physically isolated from an in-band network interface of information handling system 100, and/or other embedded information handling resources. In certain embodiments, BMC 160 may include or may be an integral part of a remote access controller (e.g., a Dell Remote Access Controller or Integrated Dell Remote Access Controller) or a chassis management controller.

In at least some embodiments described in conjunction with FIG. 2 through FIG. 6, the hybrid performance core 101 illustrated in FIG. 1 is implemented with or includes features analogous to hybrid performance cores from Intel. At least some such embodiments leverage hybrid performance core 101 to implement disclosed vulnerability features by running an embedded operating system (EOS) on an efficient core 112 in conjunction with a comprehensive vulnerability detecting module that is dynamically triggered early in the boot sequence.

Figure 2:
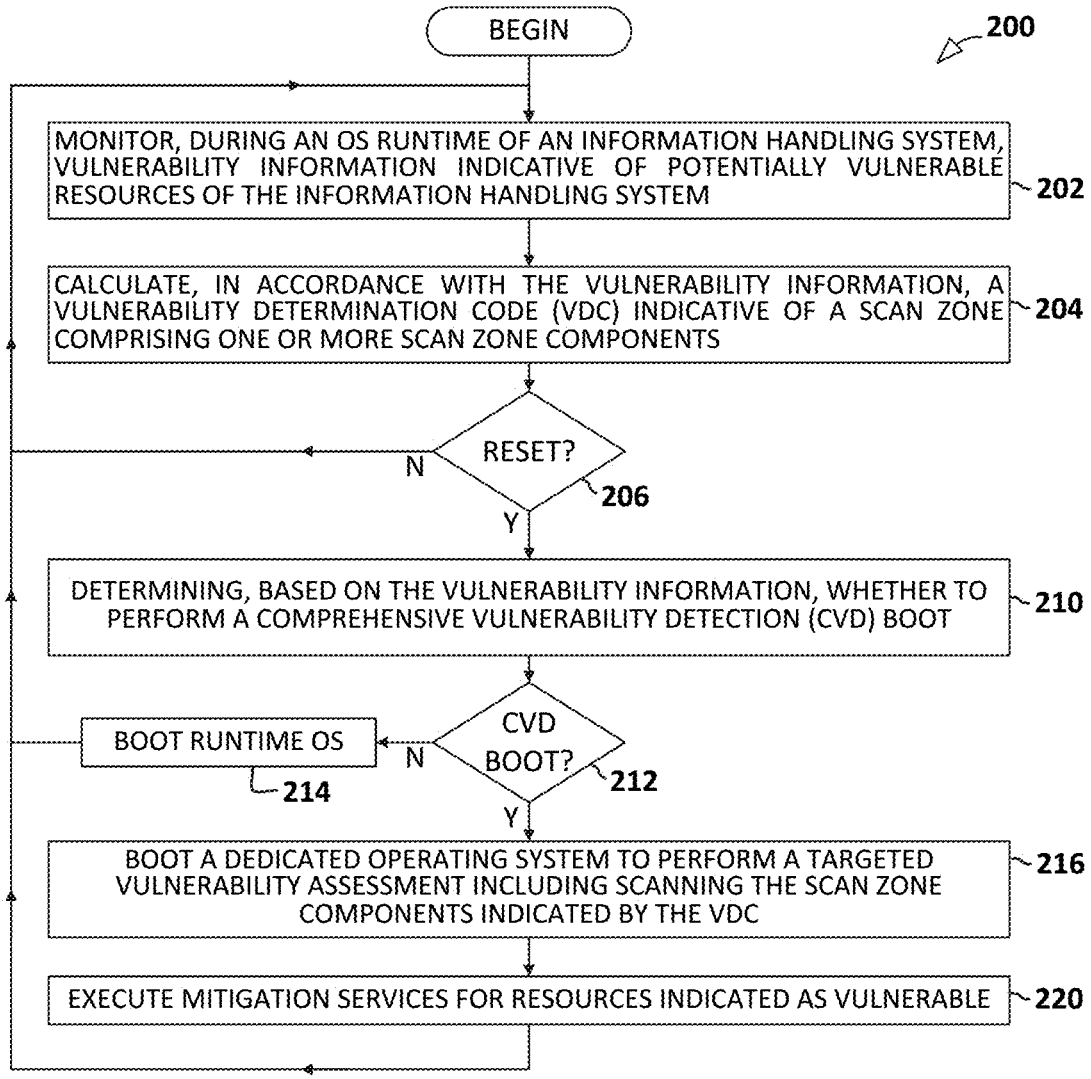
FIG. 2 illustrates a flow diagram of a vulnerability management method in accordance with disclosed teachings.

Referring now to FIG. 2 a disclosed method 200 for managing vulnerabilities in an information handling system is illustrated in block diagram format. As depicted in FIG. 2, method 200 begins with the acquisition (operation 202) of vulnerability information pertaining to potentially vulnerable resources of the system. Vulnerability information may be indicative of potentially vulnerable resources of the information handling system. To illustrate, VM and container vulnerabilities can infect a storage area and halt the system's OS boot sequence or otherwise negatively impact the system's functionality, if not quarantined before the OS booted, The monitoring and acquiring may occur during a normal OS runtime, i.e., after a runtime OS has booted and the information handling system is operational. The vulnerability information acquired is implementation-specific, but may include and/or be derived from a conglomeration of sources including, as illustrative examples, OS usage information, OS update information, firmware update information, telemetry information reported by the system. The vulnerability information may identify any of various resources including, as illustrated examples, OS-specific files, virtual machine (VMV) information, docker partitions, container images, file systems, repositories for tracking changes including without limitation, Git repositories, configuration issues and the like.

The method 200 illustrated in FIG. 2 calculates or otherwise determines (operation 204) a vulnerability determination code (VDC) based on and in accordance with the vulnerability information acquired during operation 202. Like operation 202, the calculation of the VDC may occur during the system's OS runtime and may be performed by or in conjunction with a cloud based artificial intelligence module (not explicitly depicted in FIG. 2). As illustrated in more detail in FIG. 5 and the accompanying text below, the VDC may include or otherwise reflect a conglomeration of vulnerability information associated with the system based on OS use, OS updates, firmware updates, telemetry data, etc. In some embodiments, a complete telemetry index is generated locally and sourced from the cloud based resources. In at least some embodiments, the VDC is determined based on various factors including the system's pervious boot status, corruption information, software and firmware updated and recovery information, telemetry logs, VM and/or container configuration information and so forth. The VDC may function as a secure boot enumeration path and, in embodiments that employ and utilize an EOS for vulnerability assessment and/or mitigation, the VDC may be recognizable only to the EOS. In at least some embodiments, the VDC identifies a scan zone, comprising one or more scan zone components, in which each scan zone component corresponds to a region or portion of a potentially vulnerable resource including, without limitation, a potentially vulnerability storage resource.

At some point after operations 202 and 204 have been performed during any particular runtime OS tenure of the system, a reset occurs (operation 206) and triggers a boot sequence, referred to herein as a vulnerability-aware boot sequence, during which the operations 210 through 220 illustrated in FIG. 2 may occur. In at least one embodiment, these operations beneficially occur before the runtime OS is booted.

Accordingly, prior to booting the runtime OS, the illustrated method determines (operation 210), in accordance with the vulnerability information acquired during a previous tenure of the runtime OS, whether to perform a comprehensive vulnerability detection (CVD) boot. If a CVD boot is indicated (operation 212), the CVD boot is performed (operation 216). In at least some embodiments, the CVD boot refers to a sequence that boots a dedicated operating system, such as but not necessarily limited to the EOS, to perform CVD operations including, as an example, scanning the scan zone components indicated by the VDC. In embodiments, the boot an EOS as part of the CVD boot sequence, the CVD boot sequence may be referred to as an EOS boot sequence. As depicted in FIG. 2, after the dedicated OS is booted and the CVD boot occurs, one or more mitigation services may be performed 220 in accordance with the CVD.

Figure 3:
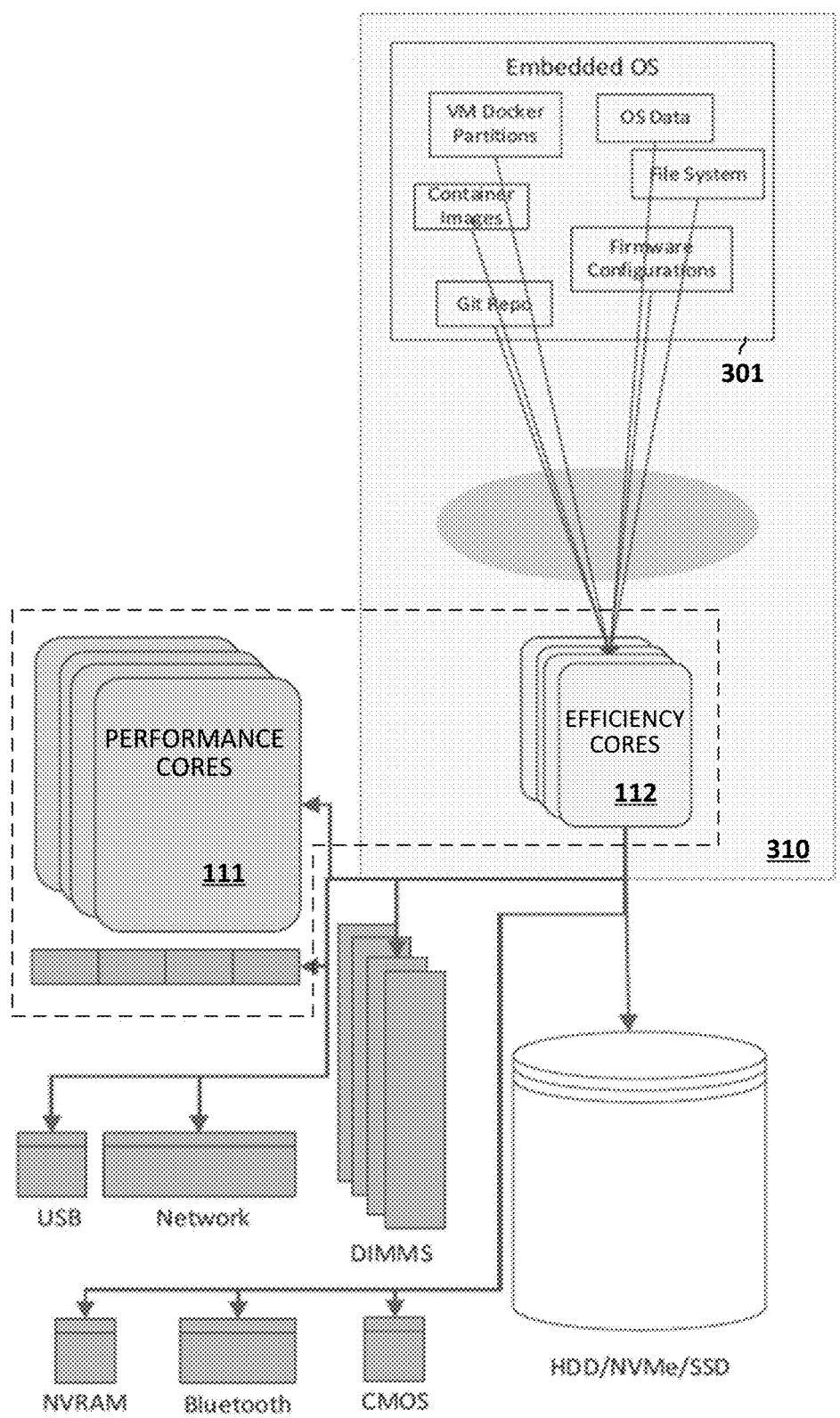
FIG. 3 illustrates a view of resource utilization during a disclosed EOS boot in which an efficiency core is exposed to an EOS.

Turning now to FIG. 3, a pre-OS or boot time view of resource utilization in accordance with a disclosed EOS boot feature. As depicted in FIG. 3, the dynamically-triggered EOS boot referenced in the preceding description of FIG. 2 exposes an efficiency core 112 to an EOS space 301 encompassing, in the depicted example, OS configuration data, VM docker partitions data, file system data, container image data, firmware configuration data, and Git repository data, as well as other resources not explicitly depicted in FIG. 3. The EOS space 301 and hybrid core 112 are illustrated in FIG. 3 as components of a deterministic quarantine domain 310 only accessible via secure boot path indicated by the VDC (see FIG. 5) that is recognizable only to EOS 301.

When an EOS boot is triggered, EOS 301 validates and dynamically enumerates that VDC-defined boot path and launches appropriate VDC modules. In at least some embodiments of the EOS boot, the VDC is injected at the pre-EFI initialization (PEI) phase, the EOS memory is allocated, and BIOS intelligently prepares the EOS context specifically to boot just the CVD module, thereby reducing the time required to boot and detect vulnerabilities.

In addition to its core functionality for pre-OS remediation of vulnerabilities, the EOS boot running on efficiency core 112 is highly power efficient because EOS 301 initializes and runs the CVD services only on the efficient core 112, which is power consumption optimized. As suggested previous, an EOS boot may scan a dynamically injected "scan core," defined by the VDC, which is confined to incremental and/or vulnerable resources relative to a previous OS run-time tenure.

Figure 4:
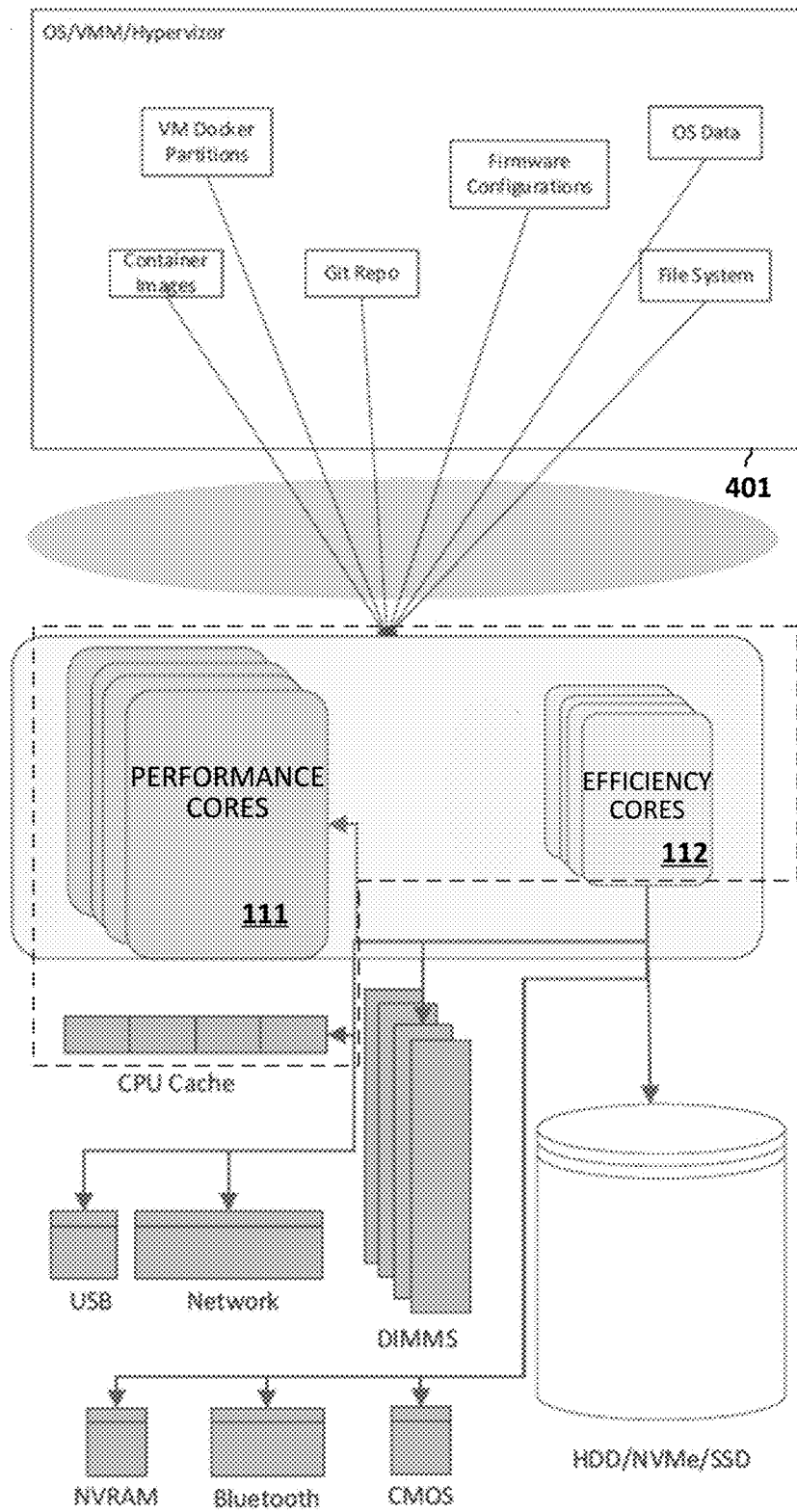
FIG. 4 illustrates an OS-runtime view of resource utilization in which performance and efficiency cores are fully exposed to runtime workloads.

FIG. 4 illustrates a run-time OS view or resource allocation in accordance with disclosed teachings. As depicted in FIG. 4, both performance core 111 and efficiency core 111 are fully exposed to workloads of the runtime OS 401.

FIG. 2 illustrates an OS-runtime view of resource utilization. The illustrated utilization is centered around a compute zone 210 that encompasses hybrid core 130 and main core 230, exposing both cores are fully exposes to runtime workloads and supporting data including OS configuration data, VM docker partition data, container image data, firmware configuration data, file system data, Git repository data, and so forth.

Figure 5:
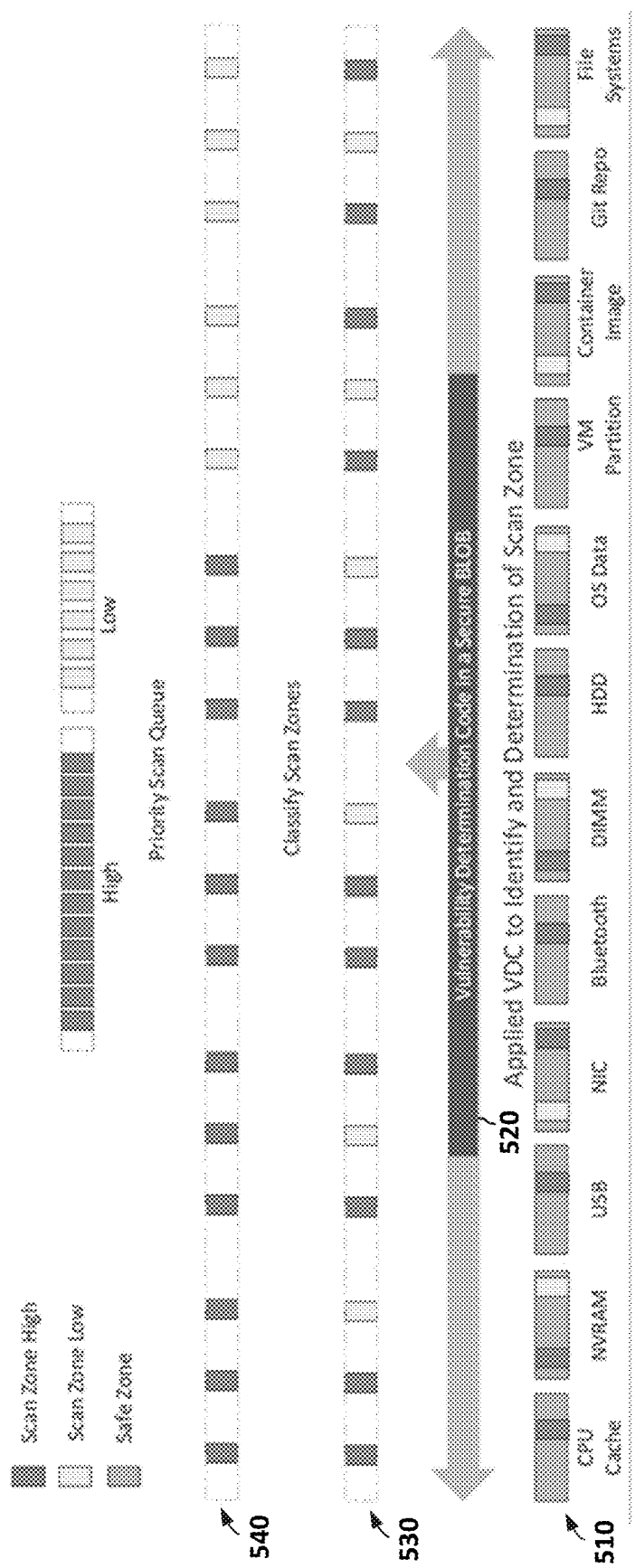
FIG. 5 illustrates a vulnerability detection code (VDC) in accordance with disclosed teachings.

FIG. 5 illustrates an exemplary VDC 510 embedded in a Secure Blob 520. VDC 510 indicates a scan zone 530, i.e., a zone of components whose resources are vulnerable or incremental from a previous boot tenure. Scan Zone 530 can span OS specific data, VM partition data, container images, file System data, a Git repository, etc. Because the scan zone components may correspond to vulnerable and/or incremental portions of the applicable resources, scan zone 530 components may be quickly scanned to determine actual vulnerabilities. As illustrated in FIG. 5, components of scan zone 530 are indicated the VDC and may be dynamically classified, e.g., as high priority and low priority, to produce a prioritized scan zone 540. Thus the depicted scan zone components, fall into one of two vulnerability categories, namely, high and low, and the prioritized scan zone 540 orders the high priority zones before the low priority zones to produce a prioritized scan zone 550 suitable for efficient and prioritized scanning.

Figure 6:
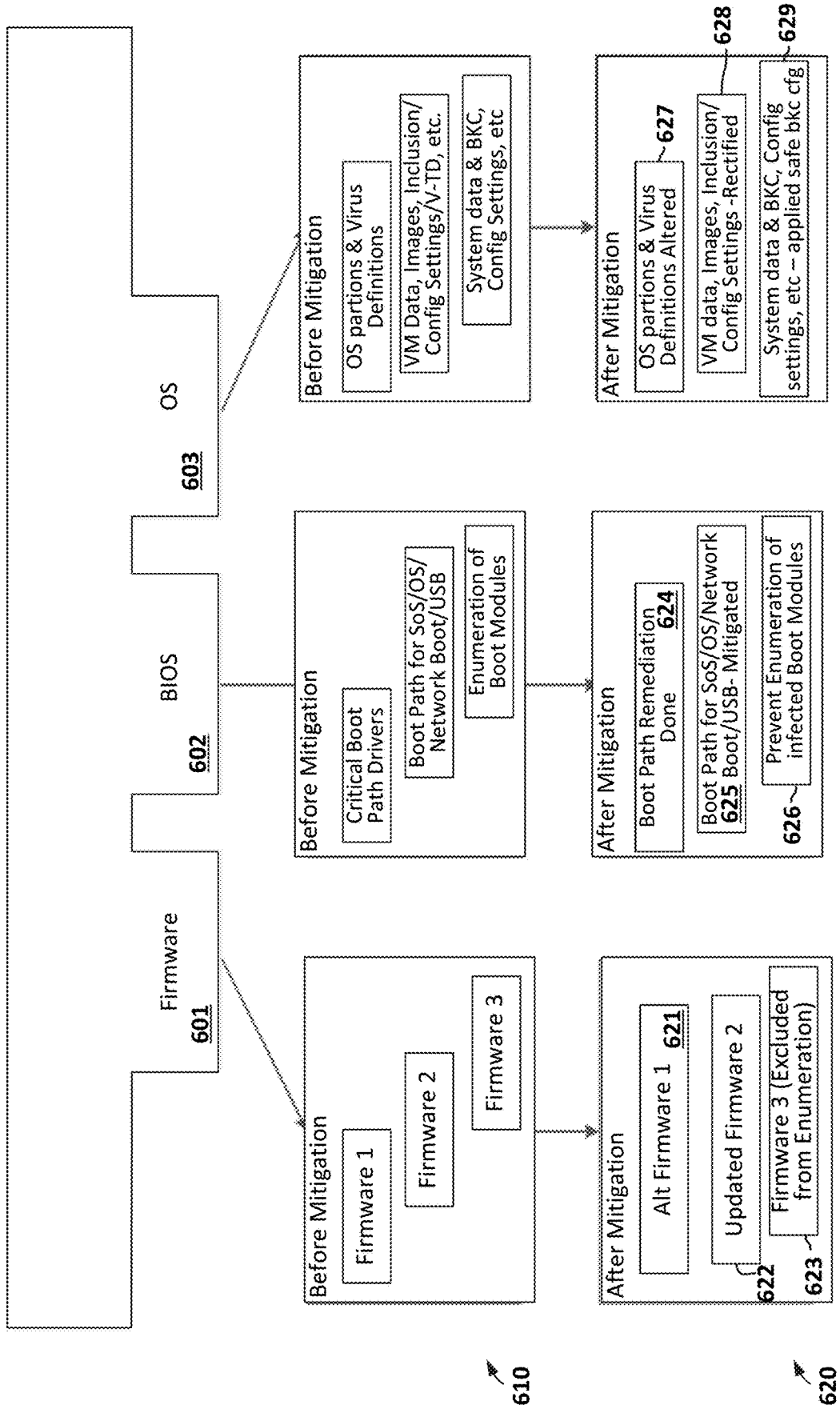
FIG. 6 illustrates pre-mitigation and post-mitigation views of firmware, BIOS, and OS space in accordance with disclosed features.

FIG. 6 illustrates a pre-mitigation space 610 and a post-mitigation space 620 before and after the CVD process illustrated in FIG. 2 through FIG. 5. As depicted in FIG. 6, post-mitigation space 420 includes, with respect to firmware resources 601, alternative firmware files 621, updated firmware files 622, and firmware 631 excluded from enumeration. FIG. 6 further illustrates with respect to BIOS resource 602, remediated boot path(s) 624, mitigated boot paths 625, and infected boot modules 625 that are prevented from being enumerated. FIG. 6 further illustrates, with respect to the runtime OS resources 603, altered OS partition and virus definitions 627, rectified VM data, images, inclusion/configuration settings, etc., 628, and verified safe system data, configuration settings 629.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
    acquiring, during an OS runtime of an information handling system, vulnerability information indicative of potentially vulnerable resources of the information handling system;
    calculating a vulnerability determination code (VDC) in accordance with the vulnerability information, wherein the VDC is indicative of a scan zone comprising one or more scan zone components, wherein each scan zone component corresponds to a region of a potentially vulnerable resource;
    responsive to detecting a system reset, performing a vulnerability aware (VA) boot sequence, wherein the VA boot sequence includes:
        prior to booting a runtime operating system, determining, in accordance with the vulnerability information, whether to perform a comprehensive vulnerability detection (CVD) boot, wherein the CVD boot is configured to boot a dedicated operating system to perform a targeted vulnerability assessment including scanning the scan zone components indicated by the VDC.

2. The vulnerability management method of claim 1, further comprising, embedding the VDC in a secure blob.

3. The vulnerability management method of claim 1, wherein the VDC comprises an authenticated boot path recognizable only to the dedicated OS.

4. The vulnerability management method of claim 1, wherein the dedicated OS comprises an embedded OS.

5. The vulnerability management method of claim 1, wherein the information handling system includes a hybrid core processor comprising one more performance cores and at least one efficiency core.

6. The vulnerability management method of claim 1, wherein the EOS executes on the efficiency core.

7. The vulnerability management method of claim 1, further comprising executing one or more mitigation services to mitigate one or more vulnerabilities identified by the targeted vulnerability assessment.

8. The vulnerability management method of claim 1, wherein the VDC is determined in accordance with multiple factors and wherein the multiple factors include one or more factors selected from a group comprising: a previous boot status of the information handling system, one or more telemetry logs, operating system (OS) specific data, virtual machine (VM) data, docker partitions, container images, and file systems.

9. An information handling system, comprising:
    a processing core;
    a memory resource, coupled to the processing core, and including processor-executable instructions that, when executed by the processing core, cause the system to preform operations including:
        acquiring, during an OS runtime of an information handling system, vulnerability information indicative of potentially vulnerable resources of the information handling system;
        calculating a vulnerability determination code (VDC) in accordance with the vulnerability information, wherein the VDC is indicative of a scan zone comprising one or more scan zone components, wherein each scan zone component corresponds to a region of a potentially vulnerable resource;
        responsive to detecting a system reset, performing a vulnerability aware (VA) boot sequence, wherein the VA boot sequence includes:
            prior to booting a runtime operating system, determining, in accordance with the vulnerability information, whether to perform a comprehensive vulnerability detection (CVD) boot, wherein the CVD boot is configured to boot a dedicated operating system to perform a targeted vulnerability assessment including scanning the scan zone components indicated by the VDC.

10. The information handling system of claim 9, further comprising, embedding the VDC in a secure blob.

11. The information handling system of claim 10, wherein the VDC comprises an authenticated boot path recognizable only to the dedicated OS.

12. The information handling system of claim 9, wherein the dedicated OS comprises an embedded OS.

13. The information handling system of claim 12, wherein the information handling system includes a hybrid core processor comprising one more performance cores and at least one efficiency core.

14. The information handling system of claim 13, wherein the EOS executes on the efficiency core.

15. The information handling system of claim 9, further comprising executing one or more mitigation services to mitigate one or more vulnerabilities identified by the targeted vulnerability assessment.

16. The information handling system of claim 9, wherein the VDC is determined in accordance with multiple factors and wherein the multiple factors include one or more factors selected from a group comprising: a previous boot status of the information handling system, one or more telemetry logs, operating system (OS) specific data, virtual machine (VMV) data, docker partitions, container images, and file systems.

* * * * *